US008392879B2

(12) United States Patent
Williams et al.

(10) Patent No.: US 8,392,879 B2
(45) Date of Patent: Mar. 5, 2013

(54) PARAMETER ASSISTANT FOR AUTOMATICALLY SPECIFYING PARAMETER VALUES FOR A SOFTWARE PROGRAM

(75) Inventors: Patrick Williams, Cedar Park, TX (US); David Rohacek, Austin, TX (US)

(73) Assignee: National Instruments Corporation, Austin, TX (US)

(*) Notice: Subject to any disclaimer, the term of this patent is extended or adjusted under 35 U.S.C. 154(b) by 2173 days.

(21) Appl. No.: 10/679,870

(22) Filed: Oct. 6, 2003

(65) Prior Publication Data
US 2005/0076002 A1 Apr. 7, 2005

(51) Int. Cl.
*G06F 9/44* (2006.01)
(52) U.S. Cl. ......... 717/113; 717/105; 717/109; 717/125
(58) Field of Classification Search ............... 702/1, 85, 702/108, 127; 715/500, 700; 719/310, 311, 719/320, 321, 328, 330, 331; 710/1, 100, 710/220, 260
See application file for complete search history.

(56) References Cited

U.S. PATENT DOCUMENTS

| 5,710,727 | A  | * | 1/1998  | Mitchell et al. | 702/128 |
| 5,724,272 | A  | * | 3/1998  | Mitchell et al. | 702/123 |
| 5,771,388 | A  | * | 6/1998  | Mondrik et al.  | 710/262 |
| 5,784,275 | A  | * | 7/1998  | Sojoodi et al.  | 700/86  |
| 6,026,233 | A  | * | 2/2000  | Shulman et al.  | 717/113 |
| 6,076,952 | A  | * | 6/2000  | Gretta et al.   | 700/83  |
| 6,233,726 | B1 | * | 5/2001  | Bowman et al.   | 717/107 |
| 6,370,569 | B1 | * | 4/2002  | Austin          | 709/217 |
| 6,507,351 | B1 | * | 1/2003  | Bixler          | 715/810 |
| 6,546,433 | B1 | * | 4/2003  | Matheson        | 719/318 |
| 6,690,390 | B1 | * | 2/2004  | Walters et al.  | 715/705 |
| 6,781,609 | B1 |   | 8/2004  | Barker et al.   |         |
| 6,792,598 | B2 |   | 9/2004  | Burch et al.    |         |
| 6,828,988 | B2 |   | 12/2004 | Hudson et al.   |         |
| 6,907,580 | B2 |   | 6/2005  | Michelman et al.|         |
| 7,055,136 | B2 | * | 5/2006  | Dzoba et al.    | 717/125 |
| 7,069,547 | B2 |   | 6/2006  | Glaser          |         |
| 7,231,630 | B2 | * | 6/2007  | Acott et al.    | 717/105 |
| 7,386,833 | B2 | * | 6/2008  | Granny et al.   | 717/109 |
| 8,051,408 | B1 | * | 11/2011 | Johnson         | 717/125 |

(Continued)

OTHER PUBLICATIONS

Tool support for refactoring functional programs, Li et al., Aug. 2003, 12 pages, <http://delivery.acm.org/10.1145/880000/871899/p27-li.pdf>.*

(Continued)

*Primary Examiner* — Thuy Dao
(74) *Attorney, Agent, or Firm* — Meyertons Hood Kivlin Kowert & Goetzel, P.C.; Jeffrey C. Hood; Jason L. Burgess

(57) ABSTRACT

A system and method for dynamically determining a plurality of possible or valid parameter values and automatically including one of the parameter values in a software program. In one embodiment, the plurality of possible parameter values may be dynamically determined based on a hardware configuration of a computer system. A graphical user interface for selecting a parameter value may be displayed. The graphical user interface may visually indicate the plurality of dynamically determined possible parameter values and may allow a user to easily select one of the possible parameter values for inclusion in the software program. User input may be received to the graphical user interface to select a first parameter value from the plurality of possible parameter values. The first parameter value may be programmatically included in the software program in response to the first parameter value being selected.

16 Claims, 11 Drawing Sheets

U.S. PATENT DOCUMENTS

| | | | |
|---|---|---|---|
| 2002/0016953 A1* | 2/2002 | Sollich | 717/1 |
| 2002/0186257 A1 | 12/2002 | Cadiz et al. | |
| 2003/0058280 A1* | 3/2003 | Molinari et al. | 345/771 |
| 2004/0001106 A1 | 1/2004 | Deutscher et al. | |
| 2004/0032429 A1* | 2/2004 | Shah et al. | 345/771 |
| 2004/0111702 A1* | 6/2004 | Chan | 717/113 |
| 2004/0221262 A1 | 11/2004 | Hampapuram et al. | |
| 2005/0028107 A1* | 2/2005 | Gomes et al. | 715/762 |
| 2005/0076002 A1 | 4/2005 | Williams et al. | |
| 2006/0036996 A1* | 2/2006 | Low | 717/113 |
| 2006/0036997 A1* | 2/2006 | Low | 717/113 |
| 2006/0107250 A1* | 5/2006 | Tarditi et al. | 717/105 |

OTHER PUBLICATIONS

R. Carlsson, Parameterized modules in Erlang, Aug. 2003, 7 pages, <http://delivery.acm.org/10.1145/950000/940885/p29-carlsson.pdf>.*

Goodyear, et al, "Debugging ASP.NET: Chapter 7—Visual Studio .NET Debugging Environment," New Riders Publishing, 2002, http://www.4guysfromrolla.com/webtech/chapters/VSNETDEBUG/CH07.PDF, 21 pages.

"Introduction to the VC++.NET Debugger," East Tennessee State University, (http://csciwww.etsu.edu/blair/Using_Debugger.htm), Aug. 10, 2002, 11 pages.

"Introduction to Visual C++ Debugging," Department of Computer Science, Virginia Tech, (http://ei.cs.vt.edu/~cs1205/c_debug/intro.html), 1997, 7 pages.

"Microsoft Word 2000," see included figures that depict a tool tip that accepts user input, 1999, 2 pages.

Berger, "Gates casts Visual Studio .Net," InfoWorld News, http://www.infoworld.com/articles/hn/xml/02/02/13/020213hngates2.html, Feb. 13, 2002, 1 page.

* cited by examiner

PARAMETER ASSISTANT FOR AUTOMATICALLY SPECIFYING PARAMETER VALUES FOR A SOFTWARE PROGRAM

FIELD OF THE INVENTION

The present invention relates to the field of software programming, and more particularly to a system and method for automatically including a dynamically determined parameter value in a software program, e.g., where the parameter value is dynamically determined based on a hardware configuration of the computer system.

DESCRIPTION OF THE RELATED ART

Computer systems are used to interact with hardware devices or instruments in many fields, including the fields of test and measurement, process control, industrial automation, simulation, machine vision, motion control, and multimedia, among others. For example, a computer system may interact with instruments to measure and/or control various types of systems. These systems may include any of various types of physical, mechanical, electrical, chemical, or thermodynamic elements or phenomena, among others, or some combination of such elements or phenomena. Exemplary systems include: an engine or an engine component, a device in motion, a chemical reaction, a petroleum refining process, a room maintained at a setpoint temperature, a system of liquids flowing among different tanks, etc.

Users commonly create computer programs to interact with the devices or instruments connected to or included in a computer system, e.g., using various application development environments. Creating a program to interact with hardware devices typically involves including calls or invocations to various functions or methods in the program. For example, functions or methods of a GPIB application programming interface (API) may be included in the program to interact with GPIB devices, functions or methods of a DAQ API may be included in the program to interact with DAQ devices, etc.

Functions or methods may take a variable number of parameters. Thus, including a function or method call in a program involves specifying the appropriate parameters. For example, the user (programmer) may configure a GPIB function call with a parameter identifying a particular GPIB resource to operate on. The user typically consults references such as online help topics or manuals to determine the correct parameter values to pass to the function or method.

However, it is not possible or not practical for the on-line help topics or manuals to specify the set of all possible or valid parameter values for some functions or methods, especially functions or methods that take hardware resources as parameters. The validity of hardware resource parameter values is often determined by the current hardware configuration of the computer system and can change over time. Thus, it would be desirable to provide a feature to automatically determine the set of possible or valid parameter values, based on the current hardware configuration of the computer system, and allow the user to select from these possible parameter values.

SUMMARY

One embodiment of the present invention comprises a system and method for dynamically determining a plurality of possible or valid parameter values and automatically including one of the parameter values in a software program. According to one embodiment, a program window for editing the software program may be displayed on a display of a first computer system. For example, an application development environment (ADE) used to create the software program may execute on the first computer system to display a program window for editing the software program. In one embodiment, the software program may comprise a text-based program, such as a C program, C++ program, Visual C++™ program, Visual Basic™ program, Java™ program, FORTRAN program, etc. In another embodiment, the software program may comprise a graphical program.

A plurality of possible or valid parameter values may be dynamically determined. In various embodiments, any of various techniques may be utilized to determine any of various kinds of parameter values. The possible parameter values may be dynamically determined based on information of any kind. In one embodiment, the possible parameter values may be dynamically determined based on a configuration of the first computer system. In another embodiment, the possible parameter values may be dynamically determined based on a configuration of a second computer system, e.g., where the second computer system is coupled to the first computer system via a network. For example, the software program may be intended to execute on the second computer system, but a user may utilize the first computer system to create the software program. In one embodiment, the user may specify the second computer system as a target computer system for the software program.

In one embodiment, the plurality of possible parameter values may be dynamically determined based on a hardware configuration of a computer system, e.g., a hardware configuration of the first computer system or the second computer system. For example, in one embodiment, the plurality of possible parameter values may be determined by programmatically examining information regarding the hardware configuration of the computer system. In various embodiments, any of various kinds of information regarding the hardware configuration of the computer system may be programmatically examined, such as one or more files that include information regarding the hardware configuration, one or more databases that include information regarding the hardware configuration, a system registry that includes information regarding the hardware configuration, etc.

In another embodiment, determining the plurality of possible parameter values may comprise programmatically querying software associated with one or more hardware devices coupled to the computer system. For example, where a first hardware device is coupled to the computer system, the first hardware device may have associated device software (e.g., configuration software, driver software, or manager software) responsible for interfacing with the first hardware device or managing a configuration of the first hardware device. The device software may provide an application programming interface (API) that allows other software to programmatically query the device software to determine information regarding the first hardware device.

In various embodiments, the plurality of possible parameter values may include any of various kinds of values based on the hardware configuration of the computer system. In one embodiment, one or more of the parameter values may correspond to hardware devices coupled to or installed in the computer system. For example, if three hardware devices are currently coupled to the computer system, then the parameter values may include three values that represent the respective devices. In various embodiments, the parameter values may represent any kind of hardware devices. In one embodiment, the parameter values may represent measurement devices coupled to the computer system, i.e., devices operable to perform a measurement function. Examples of measurement devices include GPIB devices, DAQ devices, Visa devices, image acquisition devices, motion control devices, etc.

In another embodiment, one or more of the parameter values may correspond to resources of one or more hardware devices currently coupled to the computer system. For example, if a hardware device having six resources is currently coupled to the computer system, then the parameter values may include six values that represent the respective resources. In various embodiments, the parameter values may represent any kind of resources for any kind of hardware devices. In one embodiment, the parameter values may represent resources for measurement devices coupled to the computer system. As one example, if a DAQ device having four channels is coupled to the computer system, then the parameter values may include four values that represent the respective DAQ channels, or four sets of values where each set comprises a plurality of parameter values for a respective channel. Other examples include parameter values that represent GPIB resources, Visa resources, etc.

A graphical user interface for selecting a parameter value may be displayed. The graphical user interface may visually indicate the plurality of dynamically determined possible parameter values and may allow a user to easily select one of the possible parameter values for inclusion in the software program. In various embodiments, the graphical user interface may have any kind of appearance and may utilize any kind of visual presentation to visually indicate the plurality of possible parameter values. In one embodiment, the plurality of possible parameter values may be displayed as a list.

User input may be received to the graphical user interface to select a first parameter value from the plurality of possible parameter values. In various embodiments, the user may perform any action to select the first parameter value. For example, the user may click or double-click on the first parameter value with a pointing device such as a mouse, or may utilize keyboard commands to select the first parameter value. In another embodiment, speech recognition techniques may be utilized to select the first parameter value.

The first parameter value may be programmatically included in the software program in response to the first parameter value being selected. Programmatically including the first parameter value in the software program may comprise automatically including the first parameter value in the software program, e.g., including the first parameter value in the software program without requiring manual user input to perform the actual inclusion. For example, where the software program comprises a text-based program (e.g., a C program C++ program, Java program, etc.), the first parameter value may be programmatically included in source code of the software program. For example, the first parameter value may be programmatically included in a function call or method call in the software program.

Where the software program comprises a graphical program, the first parameter value may be programmatically included in the graphical program. For example, a node in the graphical program may be programmatically configured with the first parameter value. In one embodiment, programmatically configuring the node in the graphical program with the first parameter value may comprise connecting or wiring the first parameter value to the node. For example, the first parameter value may be automatically wired to an input terminal of the node so that the node receives the first parameter value as an input parameter during execution of the graphical program. In another embodiment, programmatically configuring the node with the first parameter value may comprise modifying a value associated with the node, e.g., a value that would normally appear in a dialog box or property panel for the node.

Thus, the method described above may enable a user to easily configure a software program with one or more dynamically determined parameter values. In various embodiments, the method may be utilized to enable the user to select from any of various kinds of parameter values, where the parameter values are dynamically determined in any of various ways and based on any kind of information.

BRIEF DESCRIPTION OF THE DRAWINGS

A better understanding of the present invention can be obtained when the following detailed description of the preferred embodiment is considered in conjunction with the following drawings, in which.

Figure 1:
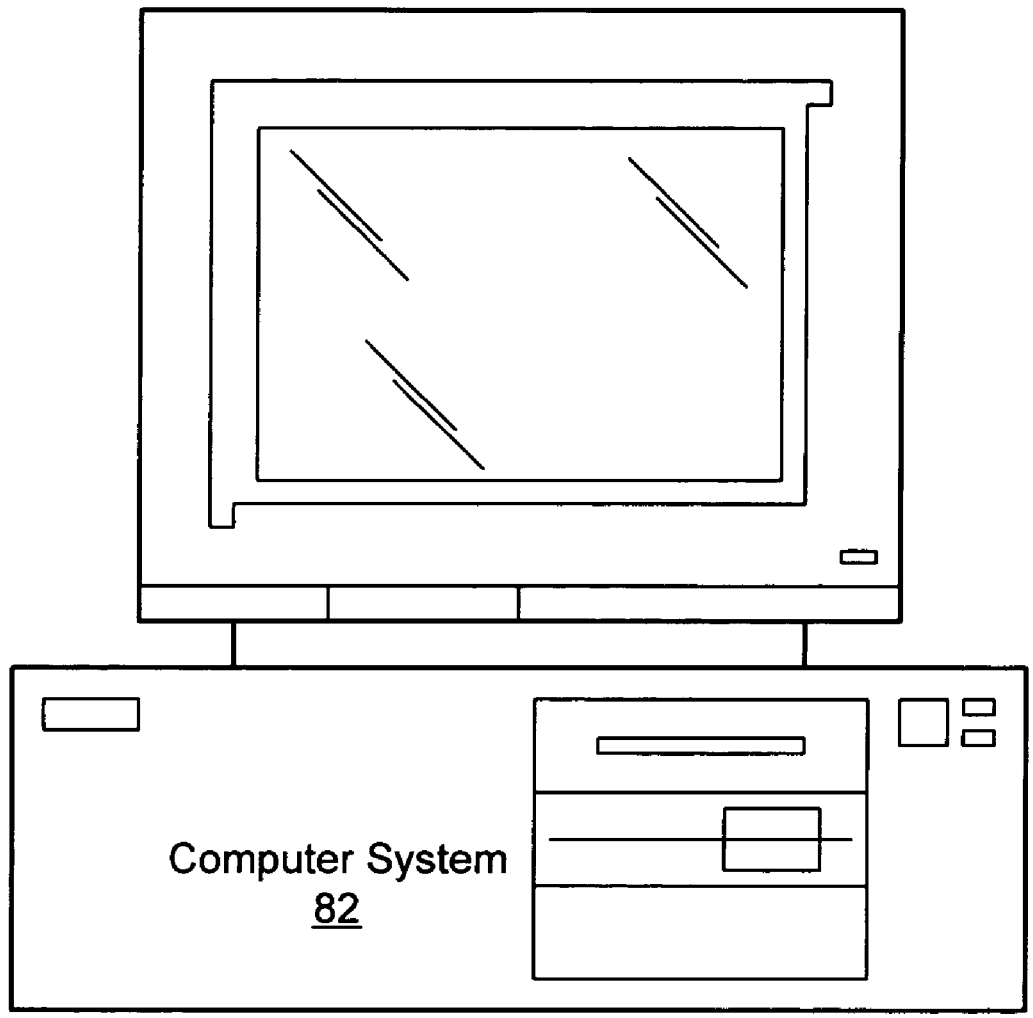
FIG. 1 illustrates an exemplary computer system 82 operable to execute an application development environment (ADE) application to create a software program.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Patent Application Publication No. 20010020291 (Ser. No. 09/745,023) titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Application Development Environment—a program useable to create a software program. For example, the application development environment (ADE) may be operable to display a program window in which the user can edit the program.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW™, DasyLab™, DiaDem and Matrixx/SystemBuild from National Instruments, Simulink™ from the MathWorks, VEE from Agilent, WiT from Coreco, Vision Program Manager from PPT Vision, SoftWIRE™ from Measurement Computing, Sancsript™ from Northwoods Software, Khoros™ from Khoral Research, SnapMaster™ from HEM Data, VisSim™ from Visual Solutions, ObjectBench by SES (Scientific and Engineering Software), and VisiDAQ™ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink™, SystemBuild, VisSim™, Hypersignal™ Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Computer System

FIG. 1 illustrates a computer system 82 operable to execute an application development environment (ADE) application to create a software program. As described above, creating the software program may comprise including one or more functions or methods (or nodes) in the software program and configuring the functions or methods (or nodes) with appropriate parameter values. In one embodiment, the ADE may provide a feature for automatically determining a set of possible or valid parameter values and allowing the user to select a desired parameter value from this set. In one embodiment, the possible parameter values may be dynamically determined based on various types of information. For example, the possible parameter values may be dynamically determined based on the current hardware configuration of the computer system 82.

As shown in FIG. 1, the computer system 82 may include a display device operable to display the program as the program is being created. As described in detail below, the display device may also display a graphical user interface that allows the user to select a desired parameter value from the set of dynamically determined parameter values. The ADE may be operable to programmatically (automatically) include the selected parameter value in the program.

The computer system 82 may also include a memory medium(s) on which one or more computer programs or software components according to one embodiment of the present invention may be stored. For example, the memory medium may store an application development environment (ADE) program operable to dynamically determine possible or valid parameter values and display the possible parameter values to the user. In one embodiment the memory medium may also store information or programs that the ADE utilizes to determine the parameter values, such as hardware configuration information or device software. The memory medium may also store operating system software, as well as other software for operation of the computer system.

Figure 2:
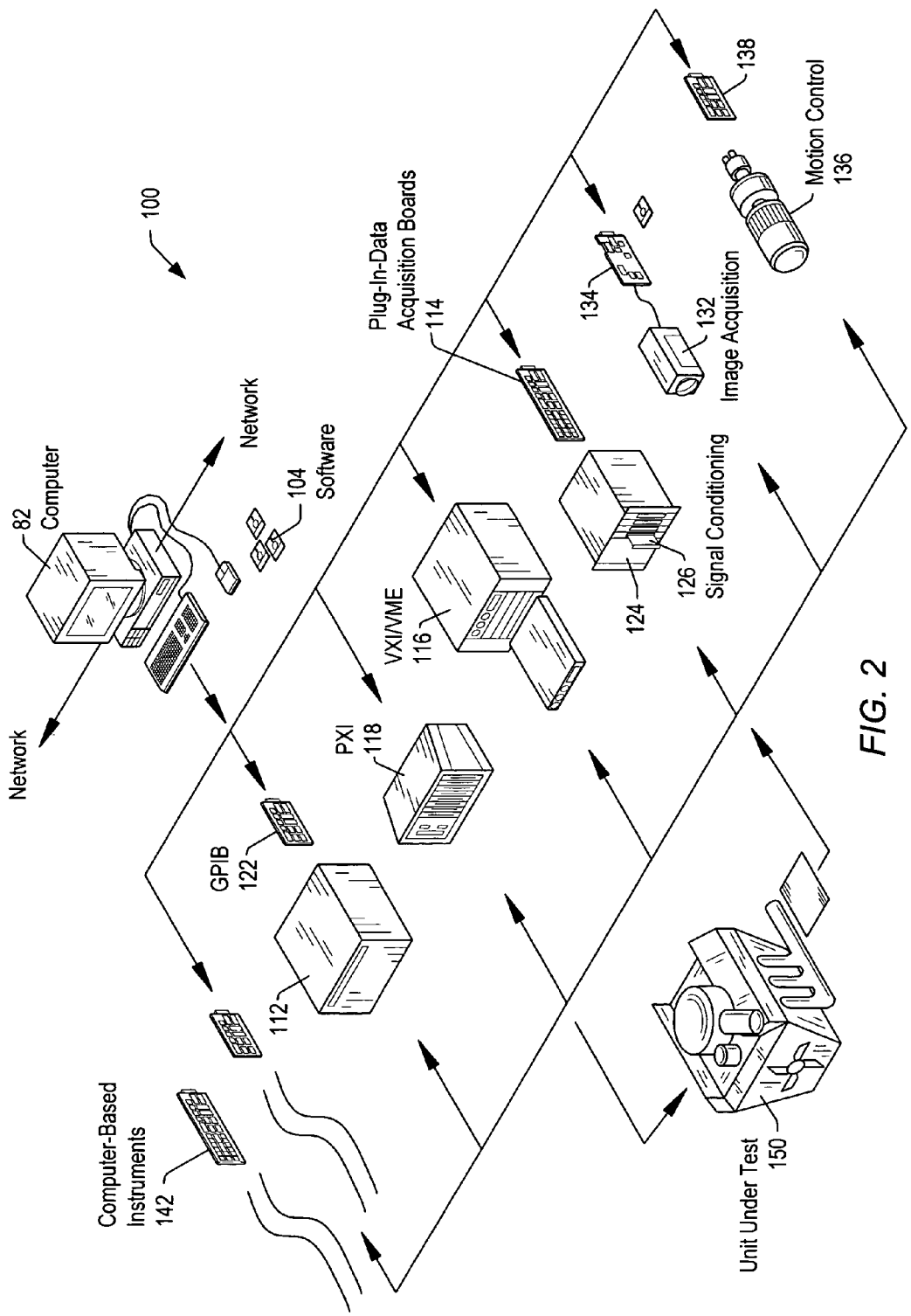
FIG. 2 illustrates an instrumentation control system according to one embodiment.

FIG. 2—Exemplary Instrumentation Control System

Embodiments of the present invention may be involved with creating software programs to perform test and/or measurement functions; control and/or model instrumentation or industrial automation hardware; perform modeling and simulation functions, e.g., modeling or simulating a device or product being developed or tested, etc. Exemplary test applications include hardware-in-the-loop testing and rapid control prototyping, among others.

However, it is noted that the present invention can be used in the creation of software programs for a plethora of applications and is not limited to the above applications. In other words, applications discussed in the present description are exemplary only, and the method described herein may be used to create software programs for any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

FIG. 2 illustrates an exemplary instrumentation control system 100. It is noted that FIG. 2 is exemplary only, and the present invention may be used in conjunction with any of various systems, as desired. The system 100 comprises a host computer 82 that connects to one or more instruments. The host computer 82 comprises a CPU, a display device, memory, and one or more input devices such as a mouse or keyboard as shown.

The computer 82 may execute an application development environment (ADE) program such as described above with reference to FIG. 1. In one embodiment, the ADE may be utilized to create a software program for execution on the computer 82 for analyzing, measuring, and/or controlling a unit under test (UUT) or process 150. The software program may interact with the one or more instruments to analyze, measure, or control the unit under test (UUT) or process 150. For example, the software program may include one or more function or method calls that were configured with parameter values corresponding to resources of the one or more instruments. As described below, these parameter values may have been dynamically determined by the ADE and automatically included in the function or method calls in response to user input.

In another embodiment, the ADE may be utilized to create a software program intended for execution on a different computer system 90 (not shown). For example, the computer system 82 may execute the ADE to create the software program, and the software program may then be deployed on the computer system 90 for execution. In another embodiment, the computer system 90 may execute the ADE to create the software program, and the software program may then be deployed on the computer system 82 for execution.

In one embodiment, the user may select a target device from among the devices or instruments coupled to the computer 82. The software program may be created on the computer 82 and then deployed to the target device for execution. In one embodiment, the target device may be remotely located from the computer 82 and coupled to the computer 82 through a network. For example, one or more of the various devices may be coupled to the computer 82 or coupled to each other via a network, such as the Internet.

Referring again to FIG. 2, the one or more instruments of the instrumentation control system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 82 via a GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged into an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. The cards 122, 134, 138 and 114 may also be implemented as external devices coupled to the computer 82, such as through a serial bus.

The VXI chassis or instrument 116 may be coupled to the computer 82 via a serial bus, MXI bus, or other serial or parallel bus provided by the computer 82. The computer 82 preferably includes VXI interface logic, such as a VXI, MXI or GPIB interface card (not shown), which interfaces to the VXI chassis 116. The PXI chassis or instrument is preferably coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the system, as desired.

Figure 3:
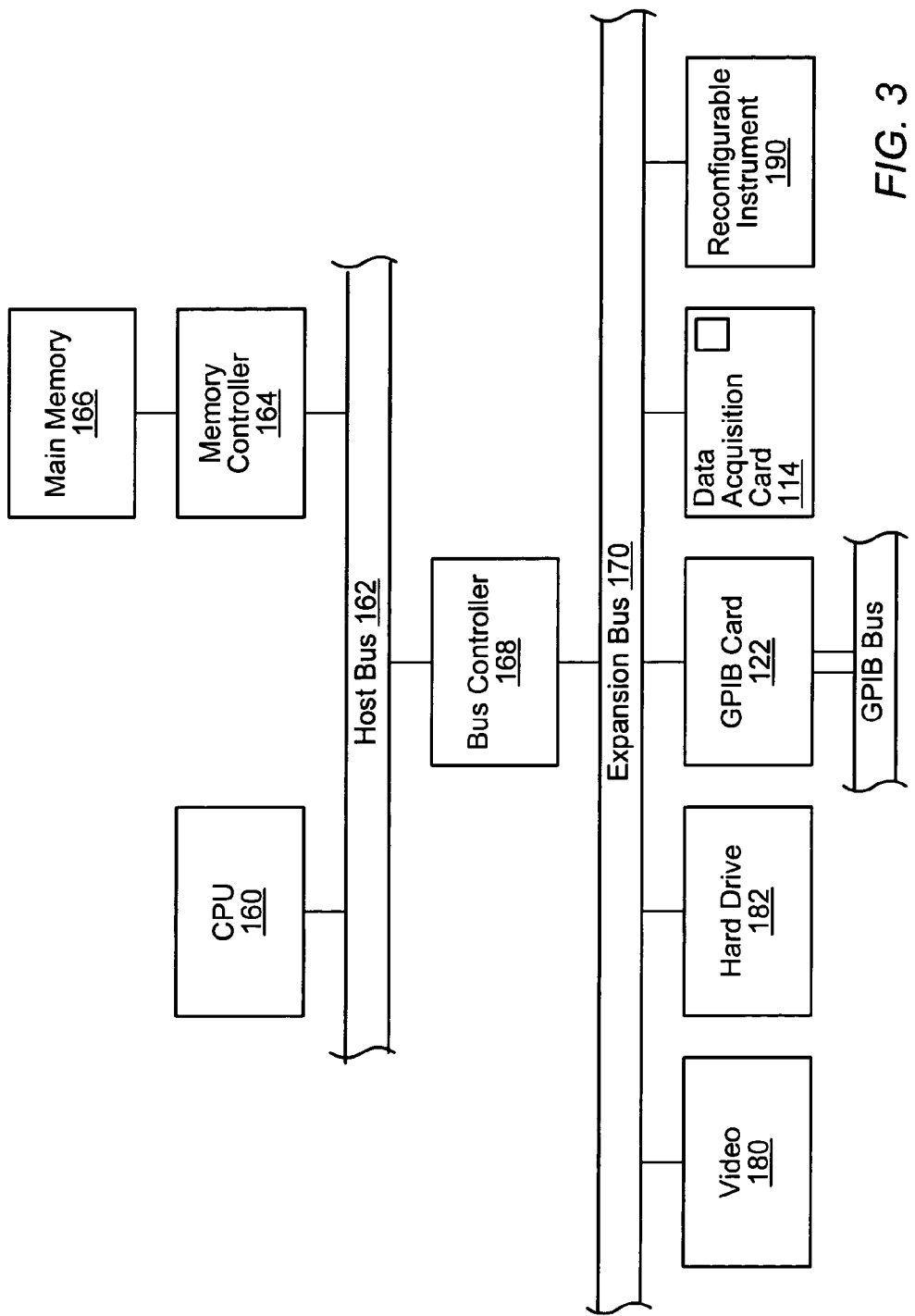
FIG. 3 is an exemplary block diagram of the computer system 82.

FIG. 3—Computer System Block Diagram

FIG. 3 is a diagram of the computer system 82 illustrated in FIGS. 1 and 2, according to one embodiment. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 82 includes at least one central processing unit or CPU 160 that is coupled to a processor or host bus 162. The CPU 160 may be any of various types, including an x86 processor, e.g., a Pentium™ class, a PowerPC™ processor, a CPU from the SPARC™ family of RISC processors, as well as others. Main memory 166 is coupled to the host bus 162 by means of memory controller 164. The main memory 166 may store software according to one embodiment of the invention, such as the software described above with reference to FIG. 1. The main memory 166 may also store operating system software as well as other software for operation of the computer system, as well known to those skilled in the art. The CPU 160 executing code and data from the main memory 166 may comprise a means for implementing the method described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 2) and a GPIB interface card 122 that provides a GPIB bus interface to the GPIB instrument 112 (of FIG. 2). A video display subsystem 180 and hard drive 182 coupled to the expansion bus 170 is also shown.

In one embodiment, a reconfigurable instrument 190 may also be connected to the computer 82. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In another embodiment, the functional unit may be included on an instrument or device connected to the computer 82 through means other than an expansion slot, e.g., the instrument or device may be connected via an IEEE 1394 bus, USB, or other type of port. Also, the functional unit may be included on a device such as the data acquisition board 114 or another device shown in FIG. 2.

Figure 4:
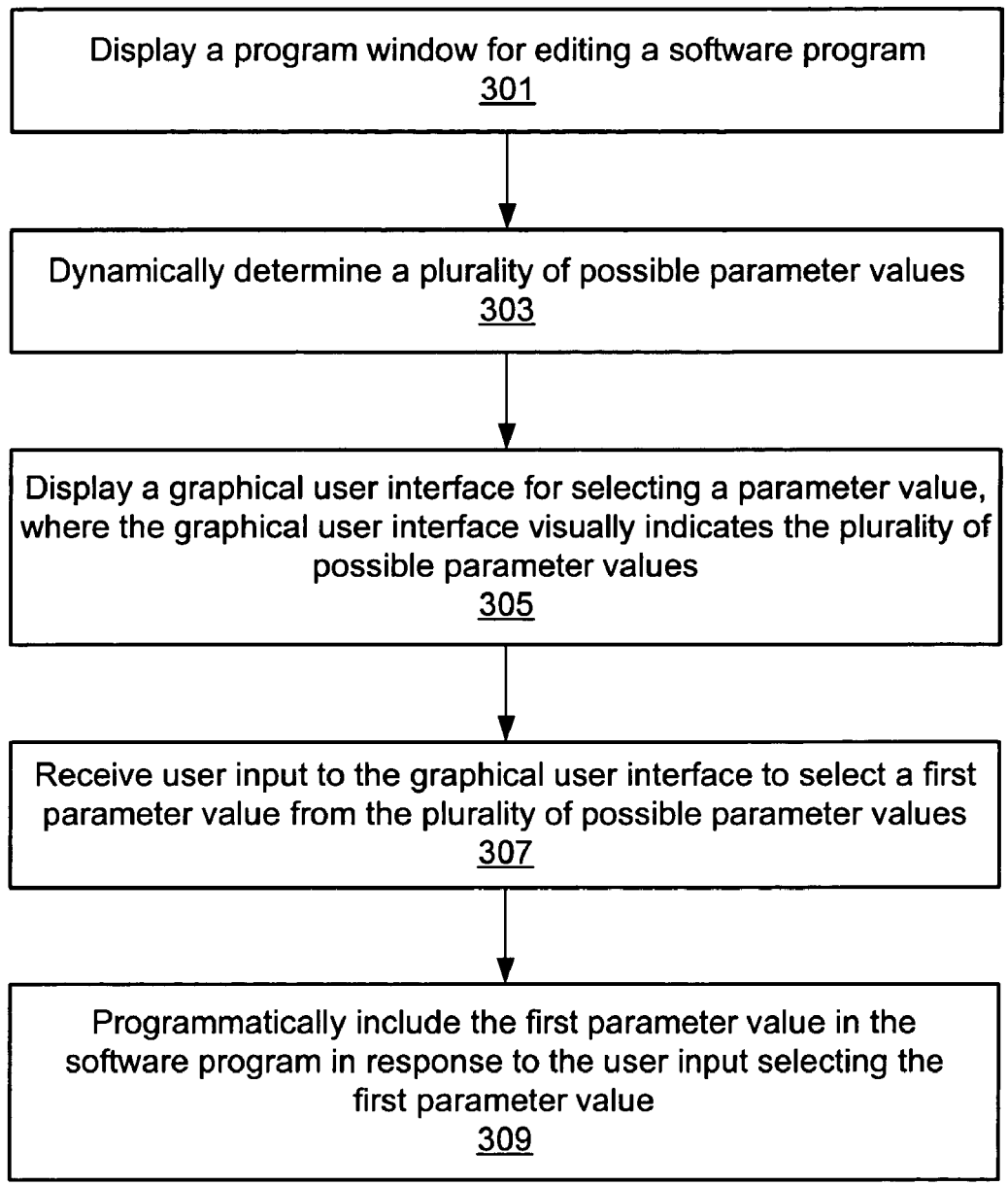
FIG. 4 is a flowchart diagram illustrating one embodiment of a method for automatically including a dynamically determined parameter value in a software program.

FIG. 4—Including a Dynamically Determined Parameter Value in a Software Program

FIG. 4 is a flowchart diagram illustrating one embodiment of a method for automatically including a dynamically determined parameter value in a software program. It is noted that FIG. 4 illustrates a representative embodiment, and alternative embodiments are contemplated. Also, various elements may be combined, omitted, or performed in different orders. The method may be implemented by software executing on a first computer system, such as the computer system 82 described above.

In 301, a program window for editing the software program may be displayed on a display of the first computer system. For example, an application development environment (ADE) used to create the software program may execute on the first computer system to display a program window for editing the software program. Examples, of application development environments include LabVIEW™ and LabWindows/CVI™ from National Instruments, Visual Studio™ (e.g., Visual Basic™, Visual C++™, etc.) from Microsoft, Delphi™ from Borland, numerous Java™ environments from various vendors, etc. In one embodiment, the software program may comprise a text-based program, such as a C program, C++ program, Visual C++™ program, Visual Basic™ program, Java™ program, FORTRAN program, etc. In another embodiment, the software program may comprise a graphical program.

In 303, a plurality of possible or valid parameter values may be dynamically determined. For example, the application development environment may execute to dynamically determine the possible parameter values, where the possible parameter values are not pre-determined, but are determined based on information or conditions that can change over time. The possible parameter values may be determined based on information or conditions that are current at the time the application development environment executes to determine the possible parameter values. Thus, different possible or valid parameter values may be determined in 303, depending on current information or conditions.

In various embodiments, any of various techniques may be utilized to dynamically determine any of various kinds of parameter values. The possible parameter values may be dynamically determined based on information of any kind. In one embodiment, the possible parameter values may be dynamically determined based on a configuration of the first computer system. In another embodiment, the possible parameter values may be dynamically determined based on a configuration of a second computer system, e.g., where the second computer system is coupled to the first computer system via a network. For example, the software program may be intended to execute on the second computer system, but a user may utilize the first computer system to create the software program. In one embodiment, the user may specify the second computer system as a target computer system for the software program.

In one embodiment, the plurality of possible parameter values may be dynamically determined based on a hardware configuration of a computer system, e.g., a hardware configuration of the first computer system or the second computer system. For example, in one embodiment, the plurality of possible parameter values may be determined by programmatically examining information regarding the hardware configuration of the computer system. As used herein, the term "programmatically" is intended to mean that the associated operation is performed by a program (e.g., as opposed to being performed manually by a person). Thus, programmatically examining the information regarding the hardware configuration may include any technique or method implemented by a program that inspects or analyzes the information.

In various embodiments, any of various kinds of information regarding the hardware configuration of the computer system may be programmatically examined, such as one or more files that include information regarding the hardware configuration, one or more databases that include information regarding the hardware configuration, a system registry that includes information regarding the hardware configuration, etc.

In another embodiment, determining the plurality of possible parameter values may comprise programmatically querying software associated with one or more hardware devices coupled to the computer system. For example, where a first hardware device is coupled to the computer system, the first hardware device may have associated device software (e.g., configuration software, driver software, or manager software) responsible for interfacing with the first hardware device or managing a configuration of the first hardware device. The device software may provide an application programming interface (API) that allows other software to programmatically query the device software to determine information regarding the first hardware device.

In various embodiments, the plurality of possible parameter values may include any of various kinds of values based on the hardware configuration of the computer system. In one embodiment, one or more of the parameter values may correspond to hardware devices coupled to or installed in the computer system. For example, if three hardware devices are currently coupled to the computer system, then the parameter values may include three values that represent the respective devices. In various embodiments, the parameter values may represent any kind of hardware devices. In one embodiment, the parameter values may represent measurement devices coupled to the computer system, i.e., devices operable to perform a measurement function. Examples of measurement devices include GPIB devices, DAQ devices, Visa devices, image acquisition devices, motion control devices, etc.

In another embodiment, one or more of the parameter values may correspond to resources of one or more hardware devices currently coupled to the computer system. For example, if a hardware device having six resources is currently coupled to the computer system, then the parameter values may include six values that represent the respective resources. In various embodiments, the parameter values may represent any kind of resources for any kind of hardware devices. In one embodiment, the parameter values may represent resources for measurement devices coupled to the computer system. As one example, if a DAQ device having four channels is coupled to the computer system, then the parameter values may include four values that represent the respective DAQ channels. Other examples include parameter values that represent GPIB resources, Visa resources, etc.

In another embodiment, one or more of the parameter values may comprise property values. For example, if a variable, field of an object, or other property can have one of several property values, each of the valid property values may be determined or looked up. In various embodiments, property values may be utilized in a program in any of various ways. The following code segment illustrates an exemplary portion of Visual Basic code in which a property value is utilized:

DataSocket d=new DataSocket( );
d.AccessMode=AccessMode.ReadAutoUpdate;

In this example, the d.AccessMode property is set to the property value AccessMode.ReadAutoUpdate. Thus, AccessMode.ReadAutoUpdate may be among the one or more parameter values determined in 303.

In 305, a graphical user interface for selecting a parameter value may be displayed. The graphical user interface may visually indicate the plurality of possible parameter values dynamically determined in 303 and may allow a user to easily select one of the possible parameter values for inclusion in the software program. In various embodiments, the graphical user interface may have any kind of appearance and may utilize any kind of visual presentation to visually indicate the plurality of possible parameter values. In one embodiment, the plurality of possible parameter values may be displayed as a list. In other embodiments, the plurality of possible parameter values may be presented to the user in ways other than or in addition to displaying them on the graphical user interface, e.g., may be presented audibly.

In various embodiments, the graphical user interface may be displayed in any location or in any window on the display of the first computer system. In one embodiment, the graphical user interface may be displayed in a portion of the program window displayed in 301. In another embodiment, the graphical user interface may be displayed in a separate window, panel, or dialog box. In one embodiment, the graphical user interface may be dockable so that the user can either view the graphical user interface in a separate window or dock the graphical user interface to the program window so that the graphical user interface is fixed within a portion of the program window.

In 307, user input may be received to the graphical user interface to select a first parameter value from the plurality of possible parameter values. In various embodiments, the user may perform any action to select the first parameter value. For example, the user may click or double-click on the first parameter value with a pointing device such as a mouse, or may utilize keyboard commands to select the first parameter value. In a system that supports speech recognition, the user may also provide speech input to select the first parameter value.

In 309, the first parameter value may be programmatically included in the software program in response to the first parameter value being selected. Programmatically including the first parameter value in the software program may comprise automatically including the first parameter value in the software program. Stated another way, programmatically including the first parameter value in the software program may comprise program instructions executing to include the first parameter value in the software program without requiring user input to perform the inclusion. For example, where the software program comprises a text-based program (e.g., a C program C++ program, Java program, etc.), the first parameter value may be programmatically included in source code of the software program. For example, the first parameter value may be programmatically included in a function call or method call in the software program.

Where the software program comprises a graphical program, the first parameter value may be programmatically included in the graphical program. For example, a node in the graphical program may be programmatically configured with the first parameter value. In one embodiment, programmatically configuring the node in the graphical program with the first parameter value may comprise connecting or wiring the first parameter value to the node. For example, the first parameter value may be automatically wired to an input terminal of the node so that the node receives the first parameter value as an input parameter during execution of the graphical program. In another embodiment, programmatically configuring the node with the first parameter value may comprise modifying a value associated with the node, e.g., a value that would normally appear in a dialog box or property panel for the node.

The program window may be updated to reflect the inclusion of the first parameter value in the software program. For example, where the first parameter value is included in a function or method call of the software program, text indicating the first parameter value may be added to the function or method call. Where the first parameter value is used to configure a node in a graphical program, a block diagram of the graphical program may be updated to visually indicate this, e.g., by displaying a wire between the first parameter value and the node. In another embodiment, a value appearing in a dialog box or property panel for the node may be updated with the first parameter value.

In one embodiment, the graphical user interface may be displayed in 305 in response to user input requesting to view the graphical user interface. In other words, the graphical user interface may not be visible until the user requests to view the graphical user interface. In another embodiment, the graphical user interface may be displayed constantly.

In one embodiment, the graphical user interface may display possible parameter values for a single function or method (or node) at any given time. The possible parameter values displayed in the graphical user interface may depend on a context in the program window. For example, if a cursor in the program window is currently placed on a call to a first function or first method, then the graphical user interface may display possible parameter values for one or more parameters of the first function or first method. If the user moves the cursor in the program window to a call to a second function or second method, the graphical user interface may be updated to display possible parameter values for one or more parameters of the second function or second method.

In another embodiment, the graphical user interface may display possible parameter values for several different functions or methods at once. The parameter values may be categorized logically, and the user may view possible parameter values in the desired category to select a desired parameter value. As one example, the graphical user interface may be operable to display possible GPIB resources under a GPIB category, Visa resources under a Visa category, DAQ resources under a DAQ category, etc. Thus, if the user wants to select a parameter value for a GPIB function, for example, the user may view the parameter values displayed in the GPIB category.

In one embodiment, the user may be able to cause the various categories to be expanded and collapsed as desired so that only the parameter values of interest are in view. The user may also be able to specify filtering criteria so that only categories of interest are displayed on the graphical user interface. In another embodiment, the method may further comprise programmatically analyzing the software program to automatically determine which categories are relevant. For example, if the software program includes GPIB function calls and Visa function calls, but not DAQ function calls, then the graphical user interface may display possible GPIB and Visa resources, but not DAQ resources. If the user later includes a DAQ function call in the software program, the graphical user interface may be updated to also display possible DAQ resources.

In various embodiments, the plurality of possible parameter values may be dynamically determined at various times or in response to any of various causes or conditions. In one embodiment, the possible parameter values may be determined when the ADE is first launched. For example, as part of the ADE's initialization procedures, the ADE may be operable to dynamically determine possible or valid parameter values for various functions or methods (or nodes). The determined parameter values may then be ready for display on the graphical user interface when necessary.

In another embodiment, the possible parameter values may not be determined until they are needed for display on the graphical user interface. For example, if the user invokes the graphical user interface from the context of a first function or first method (e.g., if the user invokes the graphical user interface while the cursor in the program window is placed on a call to the first function or first method), then possible parameter values for one or more parameters of the first function or first method may be determined at the time the graphical user interface is invoked. In one embodiment, after the possible parameter values for the first function or first method have been determined a first time, the possible parameter values may be remembered until the user exits the ADE.

In one embodiment, the system may be operable to automatically detect changes to the hardware configuration of the computer system so that the possible parameter values displayed in the graphical user interface are indicative of the current hardware configuration. For example, if a new device having new resources is added to the computer system, then new parameter values corresponding to the new resources may be displayed in the graphical user interface.

Thus, the method described above may enable a user to easily configure a software program with one or more dynamically determined parameter values. Although the examples given above relate to parameter values dynamically determined based on a hardware configuration, in various embodiments, the method may be utilized to enable the user to select from any of various kinds of parameter values, where the parameter values are dynamically determined in any of various ways and based on any kind of information. As one example, the method may be utilized to dynamically determine a plurality of possible universal resource locators (URLs). For example, where a first method takes a URL as a first parameter, valid URLs may be dynamically determined. For example, each valid URL may reference a server that is currently accessible, where the accessible servers are dynamically determined.

FIGS. 5-13: Exemplary Graphical User Interface

FIGS. 5-13 illustrate several screen shots showing an exemplary graphical user interface for selecting dynamically determined parameter values, according to one embodiment. It is noted that the graphical user interface shown is exemplary only, and numerous alternative embodiments are contemplated.

Figure 5:
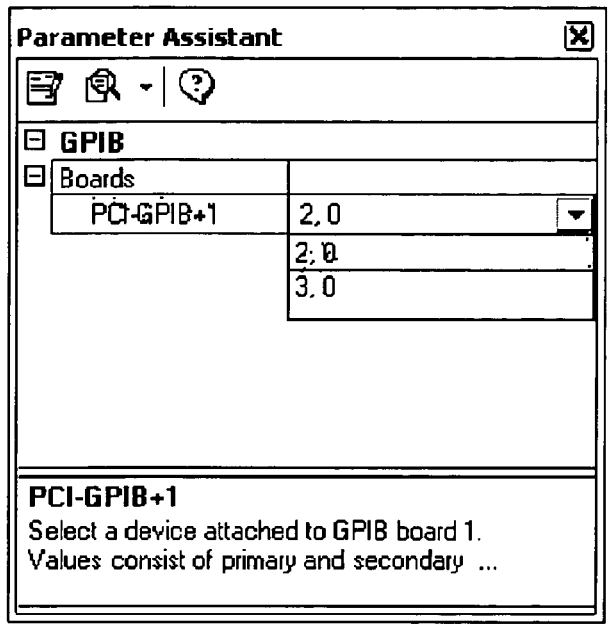
FIGS. 5-13 illustrate several screen shots showing an exemplary graphical user interface for selecting dynamically determined parameter values, according to one embodiment.

In FIG. 5, the graphical user interface displays parameter values corresponding to resources of a GPIB device coupled to the computer system. The graphical user interface indicates that there are two instruments attached to the PCI-GPIB board. Those instruments are located at GPIB primary address 2 and GPIB primary address 3. Thus, the user may select from two parameter values, e.g., to configure a GPIB function or method with a parameter value representing one of the two instruments. In this example, the parameter values are dynamically determined by querying GPIB device software to determine available GPIB devices.

Figure 6:
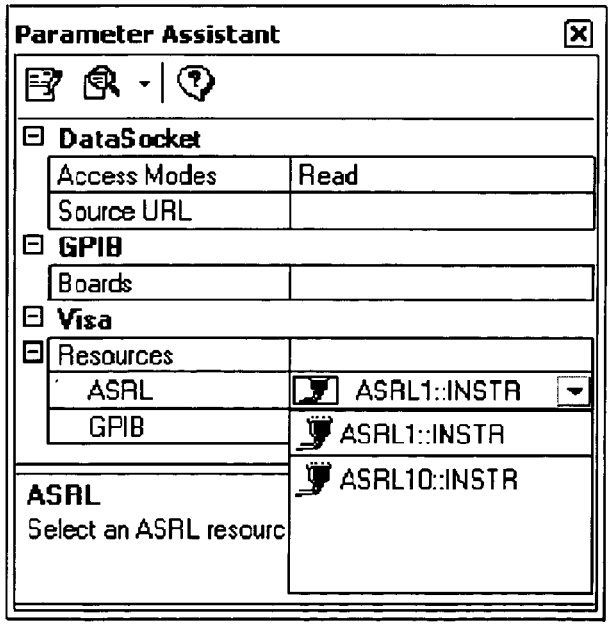

In FIG. 6, the graphical user interface displays parameter values organized into three categories: DataSocket, GPIB, and Visa. The user may view parameter values in the desired category, as described above. In this example, the user is viewing Visa serial resources. The currently selected item (ASRL::INSTR) represents a Visa serial resource. This resource is one of two serial ports on the computer system. As described above, the user may select the ASRL::INSTR parameter value to configure a Visa API call. In this example, the Visa serial resources are dynamically determined by querying Visa software to determine the valid resources.

Figure 7:
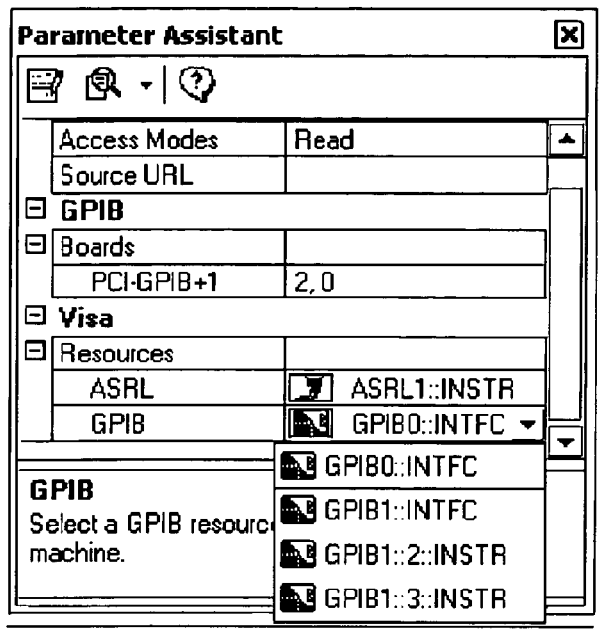

FIG. 7 is similar to the graphical user interface of FIG. 6. In FIG. 7, the user is viewing Visa GPIB resources. There are currently two GPIB boards in the user's computer system, with two instruments attached to GPIB board 1. The two instruments are located at GPIB primary addresses 2 and 3. The user may select from the parameter values shown to select the desired Visa resource representation of the GPIB boards.

Figure 8:
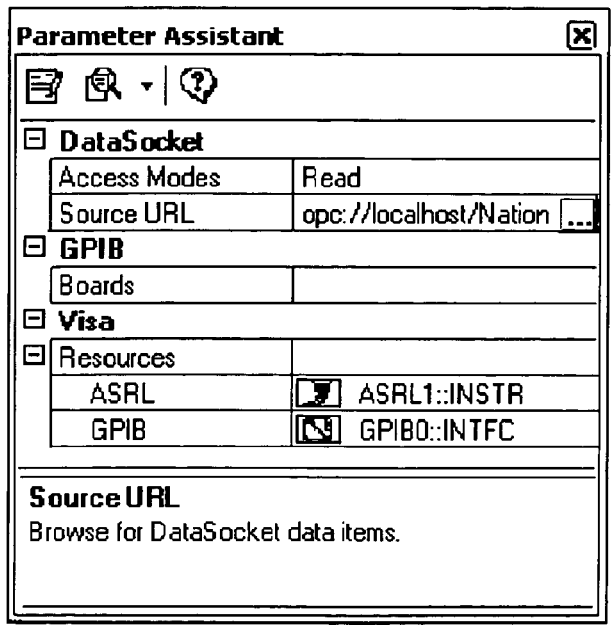
Figure 9:
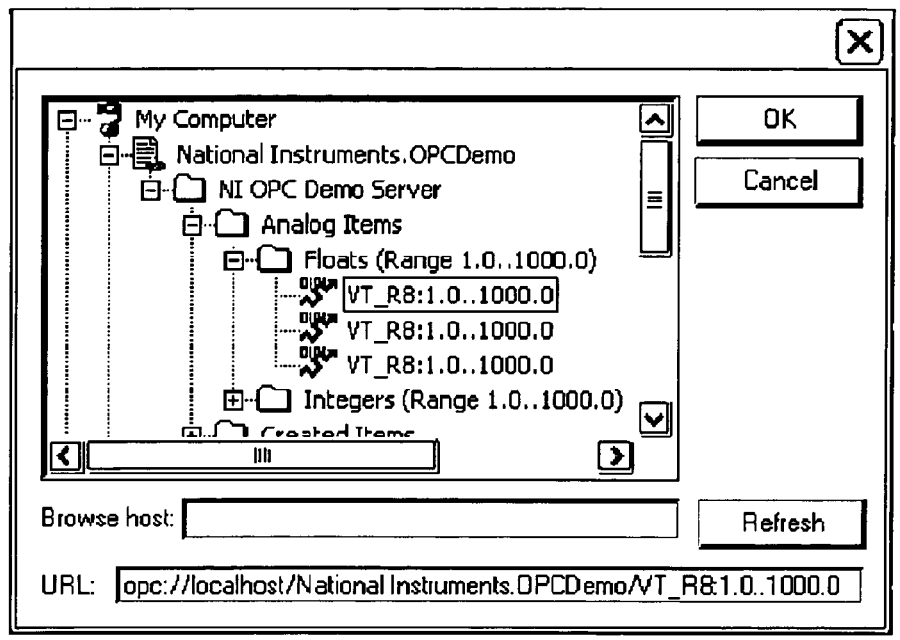

In the FIG. 8 example, the user has selected a "Source URL" parameter for a DataSocket function call to perform network communication. For example, by clicking the button on the right side labeled " . . . ", the DataSocket URL browse dialog shown in FIG. 9 may be displayed. Valid DataSocket URLs may be dynamically determined and displayed in this dialog, allowing the user to select the desired DataSocket URL. An API of the DataSocket communication software may be utilized to dynamically determine which URLs are valid.

Figure 10:
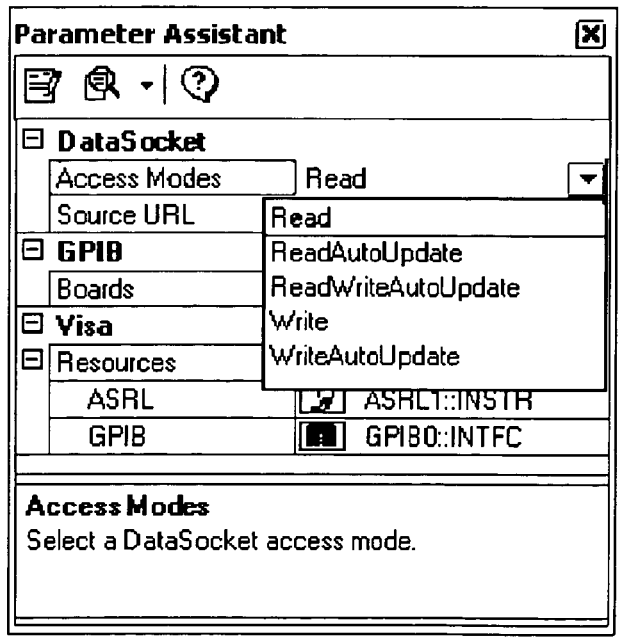

In one embodiment, the graphical user interface may also allow the user to select from parameter values that are not dynamically determined. For example, the DataSocket functions also utilize an Access Mode parameter, where the Access Mode is one of: Read, ReadAutoUpdate, ReadWriteAutoUpdate, Write, or WriteAutoUpdate, as shown in FIG. 10. These are always the possible parameter values for the Access Mode parameter; thus, it is not necessary to dynamically determine the parameter values in this case.

Figure 11:
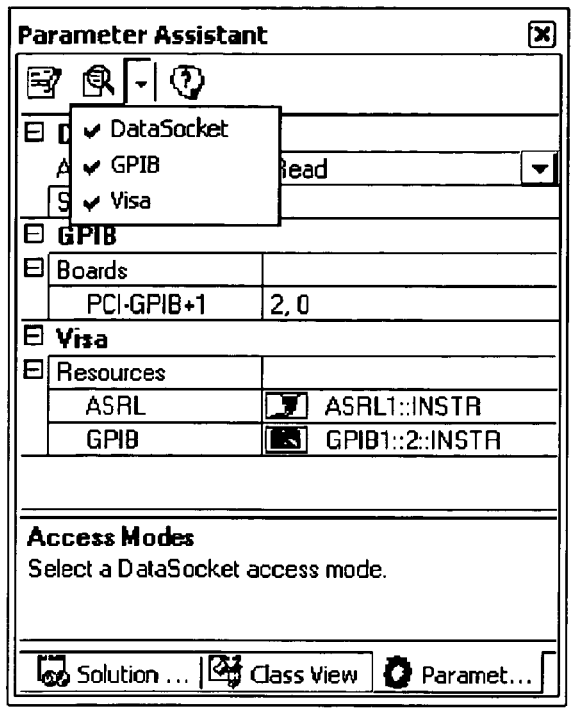
Figure 12:
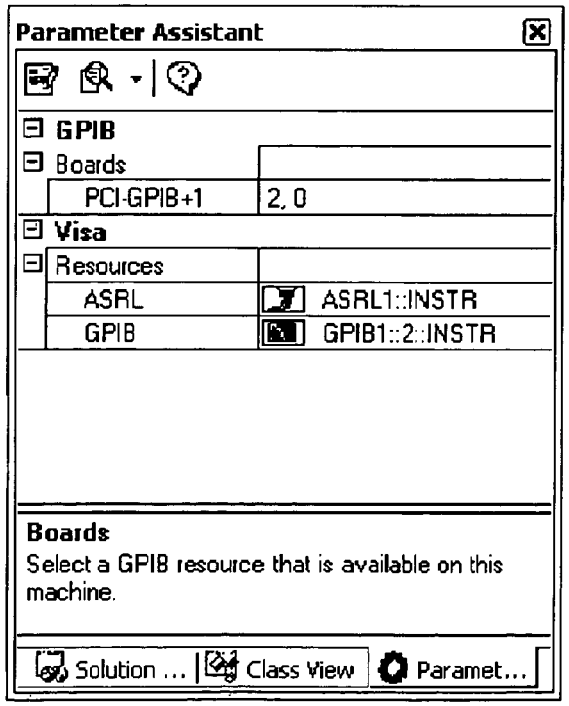
Figure 13:
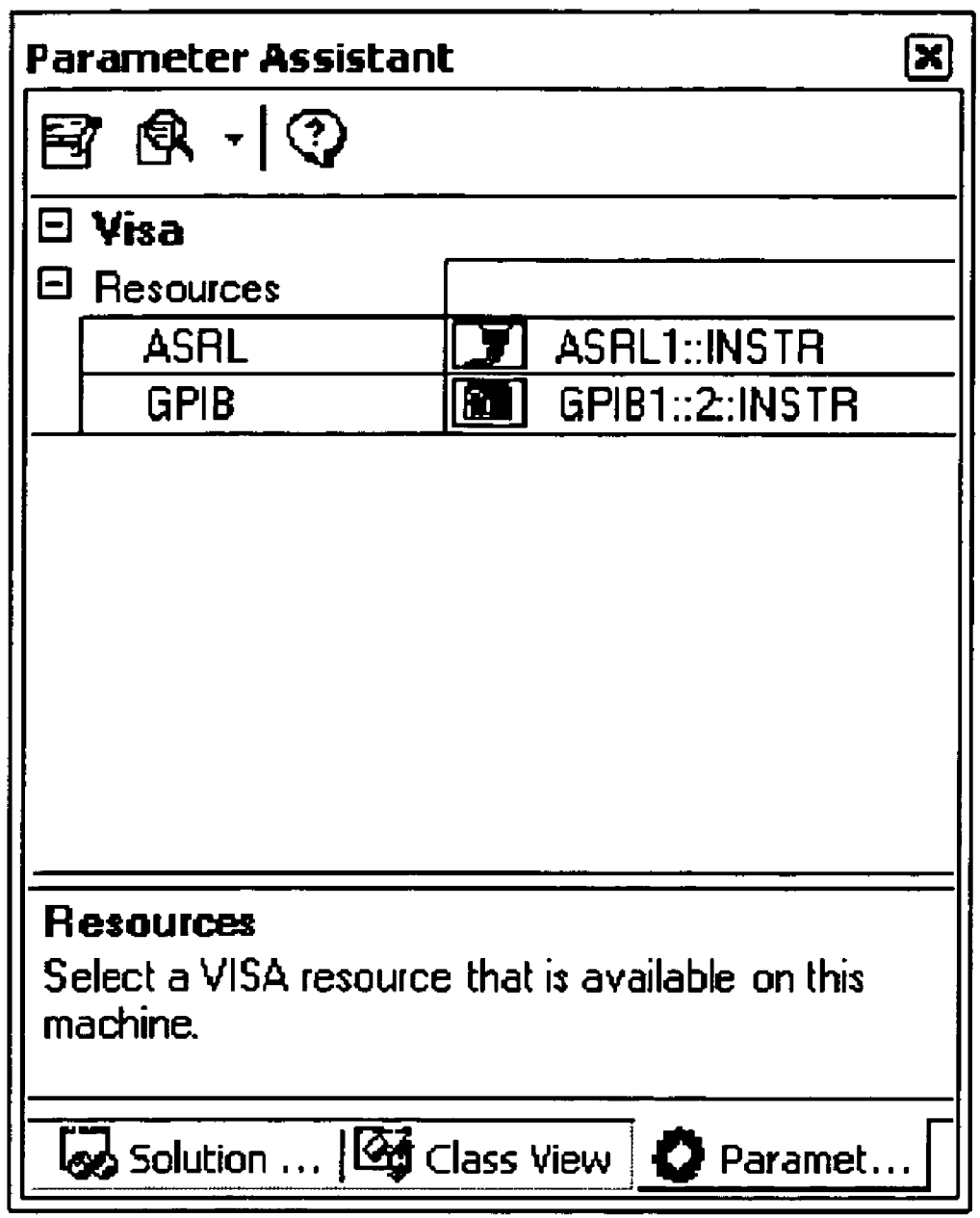

As mentioned above, in one embodiment the user may specify filtering criteria to specify which parameter values to display in the graphical user interface. In FIG. 11, the user has invoked a drop-down list to select the desired categories to display in the graphical user interface. As shown, the DataSocket, GPIB, and Visa categories are all currently selected. The user may unselect the DataSocket category to remove the parameter values related to DataSocket functions from view, as shown in FIG. 12. Similarly, the user may unselect the GPIB category to remove the parameter values related to GPIB functions from view, as shown in FIG. 13.

Figure 14:
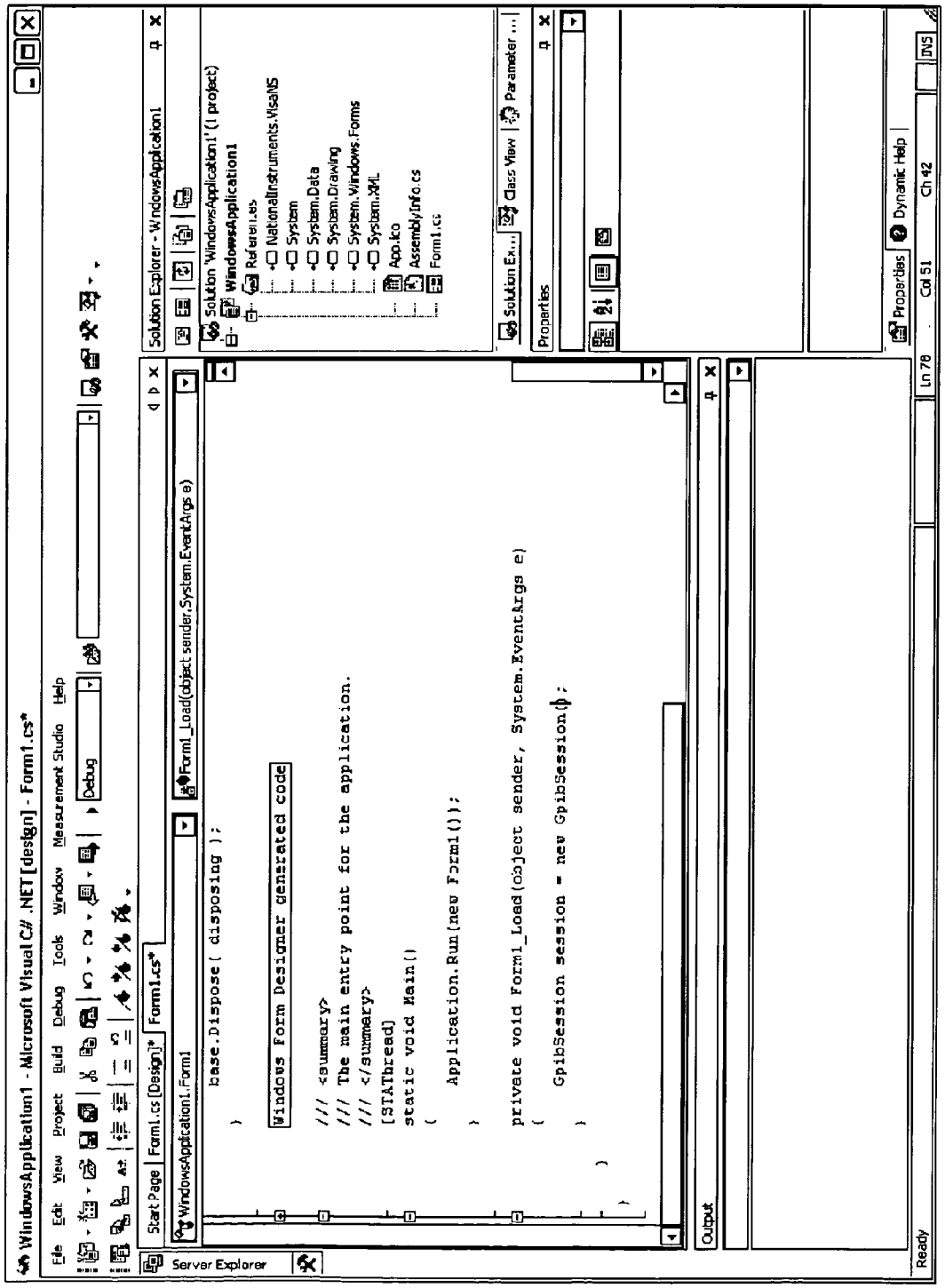
FIGS. 14 and 15 illustrate an example of utilizing the graphical user interface of FIGS. 5-13 to insert a dynamically determined parameter value in a software program.
Figure 15:
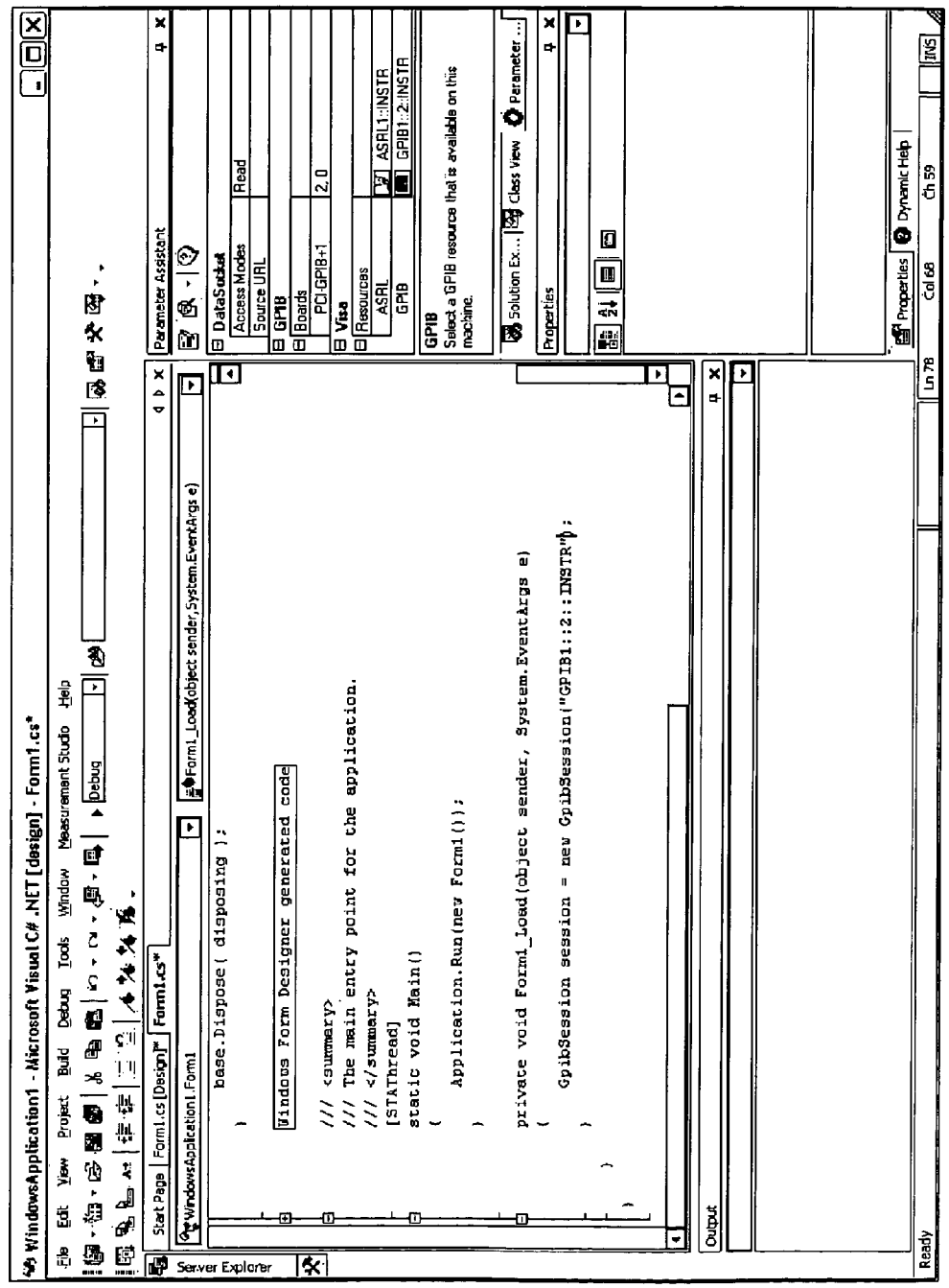

FIGS. 14 and 15 illustrate an example of utilizing the graphical user interface to insert a parameter value in a program. As shown in FIG. 14, the cursor is currently positioned in a GpibSession( ) call. The user may utilize the graphical user interface to select a Visa GPIB resource, as described above with reference to FIG. 7. FIG. 15 illustrates the program after a "GPIB1::2::INSTR" Visa GPIB resource string has been automatically inserted in the GpibSession( ) method call. In this example, the graphical user interface has been docked into the upper-right of the program window.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
in source code of a software program, displaying a first function call written in a text-based programming language that can be compiled into executable code, wherein the first function call takes a first parameter;
programmatically determining one or more valid parameter values for the first parameter of the first function call by invoking software for a measurement device in order to determine one or more hardware resources of the measurement device, wherein each of the one or more valid parameter values represents a respective hardware resource of the one or more hardware resources;
positioning a cursor on the first function call displayed in the source code in response to user input;
in response to user input requesting to select a parameter value, determining that the cursor is positioned on the first function call and displaying a graphical user interface for selecting a parameter value for the first parameter of the first function call, wherein the graphical user interface visually indicates the one or more valid parameter values;
receiving user input to the graphical user interface to select a first parameter value from the one or more valid parameter values, wherein the first parameter value represents a first hardware resource of the measurement device; and
automatically modify the first function call displayed in the source code of the software program by including the first parameter value in the first function call in response to the user input selecting the first parameter value, wherein automatically including the first parameter value in the first function call aids a user in modifying the first function call to reference the first hardware resource of the measurement device.

2. A computer-readable memory medium storing program instructions executable to:
in source code of a software program, display a first function call written in a text-based programming language that can be compiled into executable code, wherein the first function call takes a first parameter;
programmatically determine one or more valid parameter values for the first parameter of the first function call by invoking software for a measurement device in order to determine one or more hardware resources of the measurement device, wherein each of the one or more valid parameter values represents a respective hardware resource of the one or more hardware resources;
position a cursor on the first function call displayed in the source code in response to user input;
in response to user input requesting to select a parameter value, determine that the cursor is positioned on the first function call and display a graphical user interface for selecting a parameter value for the first parameter of the first function call, wherein the graphical user interface visually indicates the one or more valid parameter values;

receive user input to the graphical user interface to select a first parameter value from the one or more valid parameter values, wherein the first parameter value represents a first hardware resource of the measurement device; and automatically modify the first function call displayed in the source code of the software program by including the first parameter value in the first function call in response to the user input selecting the first parameter value, wherein automatically including the first parameter value in the first function call aids a user in modifying the first function call to reference the first hardware resource of the measurement device.

3. The computer-readable memory medium of claim 2,
wherein the measurement device comprises a GPIB device;
wherein said determining the one or more hardware resources of the measurement device comprises determining one or more hardware resources of the GPIB device;
wherein the first parameter value represents a first hardware resource of the GPIB device;
wherein said automatically including the first parameter value in the first function call comprises automatically configuring the first function call with a reference to the first hardware resource of the GPIB device.

4. The computer-readable memory medium of claim 2,
wherein the measurement device comprises a DAQ device;
wherein said determining the one or more hardware resources of the measurement device comprises determining one or more hardware resources of the DAQ device;
wherein the first parameter value represents a first hardware resource of the DAQ device;
wherein said automatically including the first parameter value in the first function call comprises automatically configuring the first function call with a reference to the first hardware resource of the DAQ device.

5. The computer-readable memory medium of claim 2,
wherein said determining the one or more valid parameter values comprises determining one or more universal resource locators (URLs) that represent the one or more hardware resources of the measurement device;
wherein the first parameter value comprises a first URL of the one or more URLs;
wherein said automatically including the first parameter value in the first function call comprises automatically configuring the first function call with a reference to the first URL.

6. The computer-readable memory medium of claim 2, wherein the program instructions are further executable to:
receive user input specifying filtering criteria for the parameter values;
wherein the graphical user interface visually indicates only a subset of the valid parameter values, wherein the subset is determined based on the specified filtering criteria.

7. The computer-readable memory medium of claim 2,
wherein the source code is displayed in a first window;
wherein said displaying the graphical user interface comprises displaying the graphical user interface in a separate window apart from the first window.

8. The computer-readable memory medium of claim 2,
wherein the source code is displayed in a first portion of a first window;
wherein said displaying the graphical user interface comprises displaying the graphical user interface in a second portion of the first window.

9. The computer-readable memory medium of claim 2,
wherein the graphical user interface displays the one or more valid parameter values as a list;
wherein said receiving user input to the graphical user interface to select the first parameter value comprises receiving user input to the graphical user interface to select the first parameter value from the list.

10. The computer-readable memory medium of claim 2,
wherein said programmatically determining the one or more valid parameter values includes programmatically determining one or more property values;
wherein said receiving user input to the graphical user interface to select the first parameter value comprises receiving user input to the graphical user interface to select a first property value;
wherein the first property value is automatically included in the first function call in response to the user input selecting the first property value.

11. The computer-readable memory medium of claim 2,
wherein the measurement device includes a plurality of channels;
wherein invoking the software for the measurement device in order to determine the one or more hardware resources of the measurement device comprises invoking the software for the measurement device in order to determine the plurality of channels.

12. The computer-readable memory medium of claim 2,
wherein said invoking the software for the measurement device in order to determine the one or more hardware resources of the measurement device is performed in response to the user input requesting to select a parameter value.

13. A computer-readable memory medium storing program instructions executable to:
in source code of a software program, display a first method call written in a text-based programming language that can be compiled into executable code, wherein the first method call takes a first parameter;
programmatically determine one or more valid parameter values for the first parameter of the first method call by invoking software for a measurement device in order to determine one or more hardware resources of the measurement device, wherein each of the one or more valid parameter values represents a respective hardware resource of the one or more hardware resources;
position a cursor on the first method call displayed in the source code in response to user input;
in response to user input requesting to select a parameter value, determine that the cursor is positioned on the first method call and display a graphical user interface for selecting a parameter value for the first parameter of the first method call, wherein the graphical user interface visually indicates the one or more valid parameter values;
receive user input to the graphical user interface to select a first parameter value from the one or more parameter values, wherein the first parameter value represents a first hardware resource of the measurement device; and
automatically modify the first function call displayed in the source code of the software program by including the first parameter value in the first method call in response to the user input selecting the first parameter value, wherein automatically including the first parameter value in the first method call aids a user in modifying the first method call to reference the first hardware resource of the measurement device.

14. A system comprising:
one or more processors;
a display device;
a measurement device; and
memory storing program instructions;
wherein the program instructions stored in the memory are executable by the one or more processors to:
in source code of a software program, display on the display device a first function call written in a text-based programming language that can be compiled into executable code, wherein the first function call takes a first parameter;
programmatically determine one or more valid parameter values for the first parameter of the first function call by invoking software for the measurement device in order to determine one or more hardware resources of the measurement device, wherein each of the one or more valid parameter values represents a respective hardware resource of the one or more hardware resources;
position a cursor on the first function call displayed in the source code in response to user input;
in response to user input requesting to select a parameter value, determine that the cursor is positioned on the first function call and display a graphical user interface for selecting a parameter value for the first parameter of the first function call, wherein the graphical user interface visually indicates the one or more valid parameter values;
receive user input to the graphical user interface to select a first parameter value from the one or more valid parameter values, wherein the first parameter value represents a first hardware resource of the measurement device; and
automatically modify the first function call displayed in the source code of the software program by including the first parameter value in the first function call in response to the user input selecting the first parameter value, wherein automatically including the first parameter value in the first function call aids a user in modifying the first function call to reference the first hardware resource of the measurement device.

15. A computer-readable memory medium storing program instructions executable to:
display a block diagram of a graphical program, wherein the block diagram includes a plurality of interconnected nodes visually indicating functionality of the graphical program, wherein the block diagram can be compiled into executable code, wherein the plurality of interconnected nodes includes a first node that takes a first input parameter;
programmatically determine one or more valid parameter values for the first input parameter of the first node by invoking software for a measurement device in order to determine one or more hardware resources of the measurement device, wherein each of the one or more valid parameter values represents a respective hardware resource of the one or more hardware resources;
display a graphical user interface for selecting a parameter value for the first input parameter of the first node, wherein the graphical user interface for selecting the parameter value visually indicates the one or more valid parameter values;
receive user input to the graphical user interface to select a first parameter value from the one or more valid parameter values, wherein the first parameter value represents a first hardware resource of the measurement device; and
automatically configure the first node with the first parameter value in response to the user input selecting the first parameter value, wherein automatically configuring the first node with the first parameter value comprises automatically updating the displayed block diagram to visually indicate that the first node receives the first parameter value as input.

16. The computer-readable memory medium of claim 15, wherein automatically configuring the first node with the first parameter value comprises automatically wiring the first parameter value to an input terminal of the first node;
wherein updating the block diagram comprises displaying a wire connecting the first parameter value to the input terminal of the first node.

* * * * *